(12) United States Patent
Zhao (10) Patent No.: US 10,025,090 B2
(45) Date of Patent: Jul. 17, 2018

(54) DISPLAY PANEL, MANUFACTURING METHOD THEREOF, AND DISPLAY DEVICE

(71) Applicant: BOE TECHNOLOGY GROUP CO., LTD., Beijing (CN)

(72) Inventor: Jisheng Zhao, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 140 days.

(21) Appl. No.: 14/395,656

(22) PCT Filed: Nov. 13, 2013

(86) PCT No.: PCT/CN2013/087029
§ 371 (c)(1),
(2) Date: Sep. 24, 2015

(87) PCT Pub. No.: WO2014/201798
PCT Pub. Date: Dec. 24, 2014

(65) Prior Publication Data
US 2016/0004067 A1    Jan. 7, 2016

(30) Foreign Application Priority Data

Jun. 20, 2013 (CN) .......................... 2013 1 0247303

(51) Int. Cl.
*G02F 1/29* (2006.01)
*G02B 26/08* (2006.01)
(Continued)

(52) U.S. Cl.
CPC ........... *G02B 26/0825* (2013.01); *G02B 1/12* (2013.01); *G02B 5/201* (2013.01); *G02B 26/0841* (2013.01); *G06F 3/011* (2013.01)

(58) Field of Classification Search
CPC ........ G02B 26/00; G02B 26/02; G02B 26/08; G02B 26/0816; G02B 26/0825;
(Continued)

(56) References Cited

U.S. PATENT DOCUMENTS 6,292,240 B1 * 9/2001 Kamiya ............ G02F 1/133553
349/110
2014/0218625 A1 * 8/2014 Kuromizu ................ H04N 5/66
348/790

FOREIGN PATENT DOCUMENTS

CN        1323997 A    11/2001
CN        1725067 A     1/2006
(Continued)

OTHER PUBLICATIONS

Mearini et. al. , tensile properties of aluminium/alumina multi-layered thin films, journal od electronic materials, vol. 22, No. 6, 623-629.*

(Continued)

*Primary Examiner* — Robert E Tallman
(74) *Attorney, Agent, or Firm* — Nath, Goldberg & Meyer; Joshua B. Goldberg; Stanley N. Protigal (57) ABSTRACT

The present invention provides display panel and manufacturing method thereof, and display device comprising the display panel. The display panel comprises: a first substrate and a second substrate provided opposite to each other, each of which comprises a plurality of photic areas and a plurality of shading areas; a plurality of pixel units formed between the first substrate and the second substrate; and a plurality of control units corresponding to the plurality of pixel units, respectively. In each pixel unit, a projection of the shading area of the first substrate on the second substrate completely covers the photic area of the second substrate. On a side of the first substrate opposite to the second substrate, a first reflective layer which is bendable is provided on each of the (Continued)

shading areas of the first substrate, and on a side of the second substrate opposite to the first substrate, a second reflective layer is provided on each of the shading areas of the second substrate. The first reflective layers, in a bent state, reflect light reaching the first reflective layers to the second reflective layers, and the second reflective layers reflect the light reflected thereto to the photic areas of the first substrate.

20 Claims, 5 Drawing Sheets

(51) Int. Cl.
  *G06F 3/01* (2006.01)
  *G02B 1/12* (2006.01)
  *G02B 5/20* (2006.01)
(58) Field of Classification Search
  CPC ............. G02B 26/0833; G02B 26/085; G02B 26/0858; G02B 26/0866; G02B 26/0875; G02B 1/12; G02B 5/20; G02B 5/201; G06F 3/01; G06F 3/011
  See application file for complete search history.

(56) References Cited

FOREIGN PATENT DOCUMENTS

| CN | 102023380 A | 4/2011 |
| CN | 102236224 A | 11/2011 |
| CN | 103323970 A | 9/2013 |

OTHER PUBLICATIONS

Thang et. al. Thickness dependent mechanical behavior of submicron aluminium films, journal of electronic materials, vol. 26, No. 7, 805-813.*
Search Report issued in International Application No. PCT/CN2013/087029, fourteen (14) pages.

* cited by examiner

DISPLAY PANEL, MANUFACTURING METHOD THEREOF, AND DISPLAY DEVICE

This is a National Phase Application filed under 35 U.S.C. 371 as a national stage of PCT/CN2013/087029, filed Nov. 13, 2013, and claims priority benefit from Chinese Application No. 201310247303.9, filed Jun. 20, 2013, the content of each of which is hereby incorporated by reference in its entirety.

FIELD OF THE INVENTION

The present invention relates to the field of display technology, and particularly to a display panel and a manufacturing method thereof, and a display device comprising the display panel.

BACKGROUND OF THE INVENTION

Display devices may be classified into two categories: a light-emitting type and a non-light-emitting type. The light-emitting type display devices include organic light-emitting diode (OLED) display devices and the like, and the pixels thereof themselves can emit required light. The non-light-emitting type display devices mainly include liquid crystal display devices, and the pixels thereof do not emit light per se and need to use light from backlight sources to display.

Figure 1:
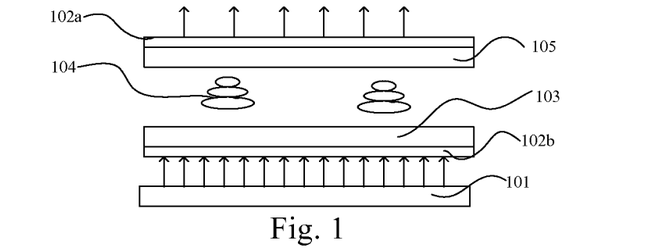
FIG. 1 is a schematic diagram of a structure of a liquid crystal display device of the prior art.

As shown in FIG. 1, a basic configuration of a liquid crystal display (LCD) device comprises a backlight source 101 and a liquid crystal display panel.

The liquid crystal display panel may comprise an array substrate 103, a color filter substrate 105 and liquid crystals 104 provided between the array substrate 103 and the color filter substrate 105. Here, a lower polarizing film 102b is provided on an outer side of the array substrate 103, an upper polarizing film 102a is provided on an outer side of the color filter substrate 105, and the polarization directions of the upper polarizing film 102a and the lower polarizing film 102b are perpendicular to each other.

Light emitted from the backlight source 101 is converted into linearly polarized light after passing through the lower polarizing film 102b on the outer side of the array substrate 103, the liquid crystals 104 are driven to rotate in different directions so that the polarization directions of the linearly polarized light are deflected to different extents, and therefore the linearly polarized light has different transmittances when passing through the polarizing film 102a on the outer side of the color filter substrate 105, which results in different brightness of emitted light and further realizes display of the liquid crystal display.

In the manufacture of a liquid crystal display panel, the array substrate 103 and the color filter substrate 105 need to be manufactured at first, and then the liquid crystals 104 are injected into and sealed between the array substrate 103 and the color filter substrate 105. This process is complex.

SUMMARY OF THE INVENTION

Technical problems to be solved by the present invention include providing a display panel which has a simple structure and is easy for manufacture, a manufacturing method thereof, and a display device comprising the display panel, in view of the problem that the existing liquid crystal display panels have a complex manufacturing process.

According to an aspect of the present invention, a display panel is provided, and the display panel comprises: a first substrate and a second substrate provided opposite to each other, each of the first substrate and the second substrate comprising a plurality of photic areas and a plurality of shading areas; a plurality of pixel units formed between the first substrate and the second substrate; and a plurality of control units which correspond to the plurality of pixel units, respectively. In each of the pixel units, a projection of the shading area of the first substrate on the second substrate completely covers the photic area of the second substrate. On a side of the first substrate opposite to the second substrate, a first reflective layer which is bendable is provided on each of the shading areas of the first substrate, and on a side of the second substrate opposite to the first substrate, a second reflective layer is provided on each of the shading areas of the second substrate. In each of the pixel units, the control unit corresponding to the pixel unit drives the first reflective layer provided on the shading area of the first substrate in the pixel unit. The first reflective layers, in a bent state, reflect light reaching the first reflective layers after passing through the photic areas of the second substrate to the second reflective layers, and the second reflective layers reflect the light reflected thereto to the photic areas of the first substrate.

In the display panel according to the present invention, the first reflective layers, driven by electrodes, become bent so that light from the backlight source is reflected to the second reflective layers which further reflect the light to a light-exiting surface of the display panel, and therefore the display function may be well achieved.

Preferably, each of the first reflective layers may comprise at least one reflective sheet, and each of the control units may comprise at least one electrode provided in the corresponding pixel unit, and each of the at least one electrode is connected to each of the at least one reflective sheet, respectively. Degree of bending of the reflective sheet may vary with a driving voltage supplied by the electrode connected thereto. According to this configuration, amount of light reflected from the first reflective layers to the second reflective layers may be changed.

Preferably, each of the control units may further comprise at least one thin film transistor, and the electrode is connected to an external control circuit via the thin film transistor.

Preferably, light reflected by the second reflective layers provided on two adjacent shading areas of the second substrate may have different colors.

Preferably, every three pixel units may constitute one pixel structure.

In each pixel structure, a red filter, a green filter and a blue filter may be provided on the second reflective layers provided on the shading areas of the second substrate in the three pixel units, respectively.

Alternatively, in each pixel structure, quantum dots with particle diameters of 4 to 6 nm and quantum dots with particle diameters of 2.2 to 3 nm may be provided on the second reflective layers provided on the shading areas of the second substrate in two of the three pixel units, respectively, and when excited by blue light, the quantum dots with particle diameters of 4 to 6 nm emit red light and the quantum dots with particle diameters of 2.2 to 3 nm emit green light.

Preferably, a material of the quantum dots may include any one or more of CdSe/ZnSe, CdSe/ZnS, CdSe/CdS, CdS/ZnS, CdS/HgS, CdSe/ZnS/CdS, CdSe/CdS/ZnS.

Preferably, each of the reflective sheets may comprise a light-reflecting film and an electro-bend film attached to the light-reflecting film, the electrode may be provided on the side of the first substrate opposite to the second substrate, and the electro-bend film is connected to the electrode.

Preferably, the electro-bend film may be made of a material containing polyacrylic rubber or vinylidene fluoride compound. The electro-bend film may bend in a direction away from the first substrate when driven by the electrode.

Preferably, the light-reflecting film may be made of a material containing any one of reflective fabric, aluminium and copper.

Preferably, the second reflective layer may be made of a material including any one of reflective fabric, aluminium and copper.

Preferably, the display panel may further comprise a shielding layer, which covers the shading areas of the first substrate.

According to another aspect of the present invention, a manufacturing method of a display panel is provided, and the manufacturing method comprises steps of: preparing a first substrate including a plurality of photic areas and a plurality of shading areas; forming first reflective layers which are bendable on the shading areas of the first substrate; preparing a second substrate including a plurality of photic areas and a plurality of shading areas; forming second reflective layers on the shading areas of the second substrate; and forming the display panel with the first substrate and the second substrate. A side of the first substrate on which the first reflective layers are formed is opposite to a side of the second substrate on which the second reflective layers are formed, and projections of the shading areas of the first substrate on the second substrate completely cover the photic areas of the second substrate.

Preferably, the step of forming the first reflective layers may comprise steps of: sequentially forming an electrode layer, an electro-bend film layer and a light-reflecting film layer on the first substrate; sequentially removing the light-reflecting film layer and the electro-bend film layer on the photic areas of the first substrate through an etching process, and keeping the light-reflecting film layer and the electro-bend film layer on the shading areas of the first substrate, and the remaining light-reflecting film layer and electro-bend film layer forming reflective sheets, and the reflective sheets forming the first reflective layers on the shading areas of the first substrate; and patterning the electrode layer through an etching process to form electrodes, such that each of the electrodes is at one end of the reflective sheet.

Preferably, the manufacturing method may further comprise a step of: forming a shielding layer covering the shading areas of the first substrate on the first substrate.

According to still another aspect of the present invention, a display device is provided, and the display device comprises a backlight source and the display panel according to the present invention.

Since the display device comprises the display panel according to the present invention, the display device according to the present invention may achieve display of different greyscales.

Preferably, the display device may further comprise a backlight source used as a light source for the display panel. The backlight source may emit white light or blue light.

Preferably, the second substrate of the display panel may be integrated with an optical film material of the backlight source of the display device Preferably, the optical film material may comprise any one of a light guide plate, a diffusion plate and a prism film.

Reference numerals in the respective accompanying drawings:
101, backlight source;
102a, upper polarizing film;
102b, lower polarizing film;
103, array substrate;
104, liquid crystal;
105, color filter substrate;
201, first reflective layer;
202, second reflective layer;
203, electrode;
204, first substrate;
205, second substrate;
206, shielding layer;
Q1, photic area;
Q2, shading area;
601, electrode layer;
602, electro-bend film layer;
603, light-reflecting film layer;
602', electro-bend film;
603', light-reflecting film.

DETAILED DESCRIPTION OF THE EMBODIMENTS

To enable those skilled in the art to better understand the technical solutions of the present invention, the present invention will be further described below in detail in conjunction with the accompanying drawings and the specific implementations.

Figure 2:
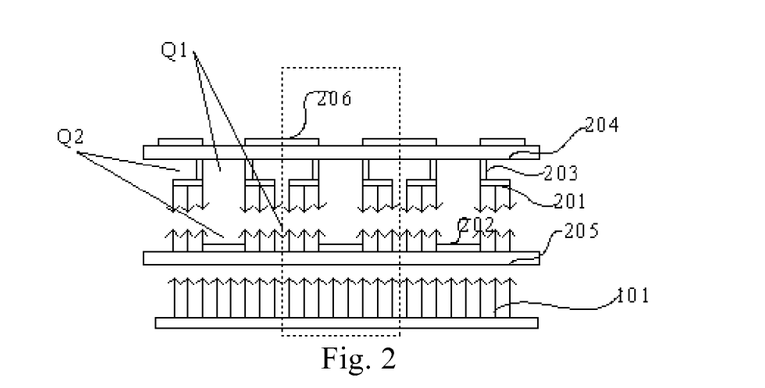
FIG. 2 is a schematic diagram of a structure of a display panel with no voltage applied thereto according to an embodiment of the present invention.
Figure 3:
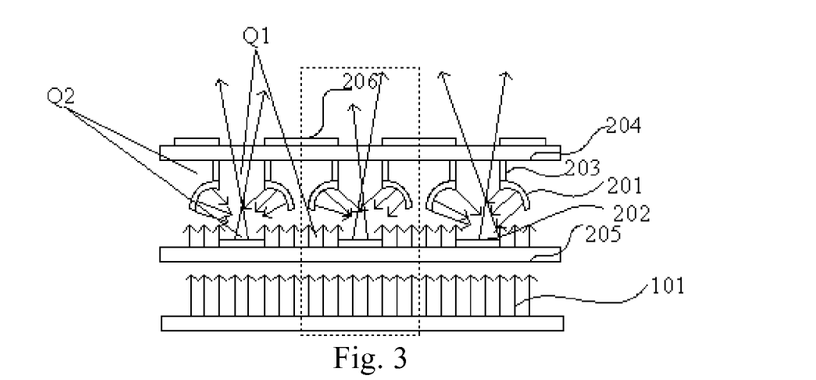
FIG. 3 is a schematic diagram of a structure of a display panel with a voltage applied thereto according to an embodiment of the present invention.
Figure 4:
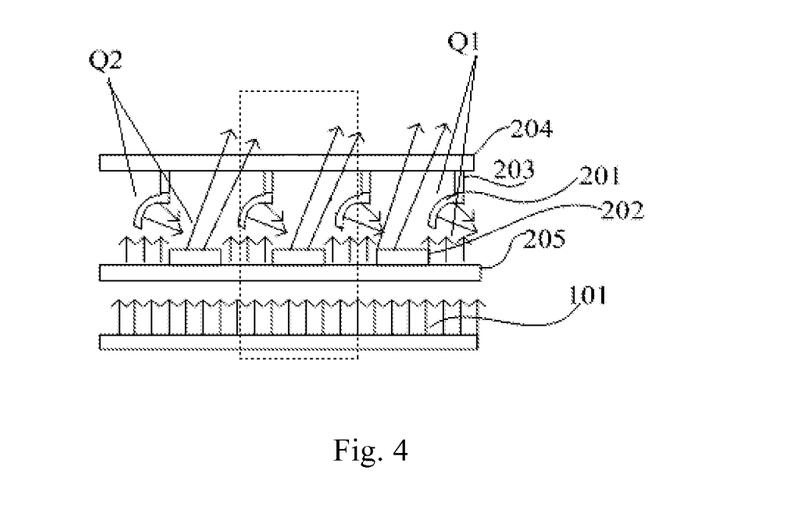
FIG. 4 is a schematic diagram of a structure of a display panel according to another embodiment of the present invention.

FIG. 2 is a schematic diagram of a structure of a display panel with no voltage applied thereto according to an embodiment of the present invention, FIG. 3 is a schematic diagram of a structure of a display panel with a voltage applied thereto according to an embodiment of the present invention, and FIG. 4 is a schematic diagram of a structure of a display panel according to another embodiment of the present invention.

Referring to FIGS. 2 to 4, a display panel according to an embodiment of the present invention comprises a first substrate 204 and a second substrate 205 provided opposite to each other, and each of the first substrate 204 and the second substrate 205 comprises a plurality of photic areas Q1 and a plurality of shading areas Q2. The display panel further comprises a plurality of pixel units (the dashed box represents one pixel unit) formed between the first substrate 204 and the second substrate 205 and a plurality of control units (shown as electrodes 203 in figures) corresponding to the plurality of pixel units, respectively. In each of the pixel units, a projection of the shading area Q2 of the first substrate 204 on the second substrate 205 completely covers the photic area Q1 of the second substrate 205.

On a side of the first substrate 204 opposite to the second substrate 205, a first reflective layer 201 which is bendable is provided on each of the shading areas Q2 of the first substrate 204, and on a side of the second substrate 205 opposite to the first substrate 204, a second reflective layer 202 is provided on each of the shading areas Q2 of the second substrate 205.

In each of the pixel units, the control unit (shown as an electrode 203 in figures) corresponding to the pixel unit drives the first reflective layer 201 provided on the shading area Q2 of the first substrate 204. The first reflective layers 201, in a bent state, reflect light reaching the first reflective layers 201 after passing through the photic areas Q1 of the second substrate 205 to the second reflective layers 202, and the second reflective layers 202 reflect the light reflected thereto to the photic areas Q1 of the first substrate 204.

According to an embodiment of the present invention, in each of the pixel units (referring to the dashed box in FIGS. 2 and 3), photic area(s) Q1 and shading area(s) Q2 are provided on both the first substrate 204 and the second substrate 205, specifically, one photic area Q1 and two shading areas Q2 adjacent thereto are provided on the first substrate 204, and one shading area Q2 and two photic areas Q1 adjacent thereto are provided on the second substrate 205. In each of the pixel units, the projections of the shading areas Q2 of the first substrate 204 on the second substrate 205 completely cover the photic areas Q1 of the second substrate 205. It can be understood easily by those skilled in the art that, on the first substrate 204, the shading areas Q2 of two adjacent pixel units may be combined into one shading area; and on the second substrate 205, the photic areas Q1 of two adjacent pixel units may be combined into one photic area.

According to another embodiment of the present invention, as shown in FIG. 4, in each of the pixel units (referring to the dashed box in FIG. 4), a photic area Q1 and a shading area Q2 are provided on both the first substrate 204 and the second substrate 205, specifically, one photic area Q1 and one shading area Q2 adjacent thereto are provided on the first substrate 204, and one shading area Q2 and one photic area Q1 adjacent thereto are provided on the second substrate 205.

Each of the first reflective layers 201 may comprise at least one reflective sheet, and each of the control units may comprise at least one electrode 203 provided in the corresponding pixel unit, and each of the at least one electrode is connected to each of the at least one reflective sheet, respectively. Degree of bending of the reflective sheet may vary with a driving voltage supplied by the electrode 203 connected thereto, so as to change amount of light reflected from the first reflective layer 201 to the second reflective layer 202.

FIGS. 3 and 4 illustrate two exemplary structures. In the structure shown in FIG. 3, the first reflective layer 201 may comprise two reflective sheet sets, in the structure shown in FIG. 4, the first reflective layer 201 may comprise only one reflective sheet set, and one reflective sheet set may include at least one reflective sheet therein.

Referring to FIG. 2, when on voltage is applied to the display panel according to the present invention, the electrodes 203 do not provide driving voltages, and the first reflective layers 201 electrically connected to the electrodes 203 will not bend. Surfaces of the first reflective layers 201 are substantially perpendicular to a direction in which light is emitted from the backlight source 101, and therefore the first reflective layers 201 may totally reflect the light emitted from the backlight source 101 back. In this case, the light of the backlight source 101 will not pass through the display panel, that is, the display panel displays as all black.

Referring to FIG. 3, when a voltage is applied to the display panel according to the present invention, the electrodes 203 provide certain driving voltages so that the first reflective layers 201 electrically connected to the electrodes 203 bend. Therefore, the first reflective layers 201 may reflect light, reaching the first reflective layers 201 after passing through the photic areas Q1 of the second substrate 205 from the backlight source 101, to the second reflective layers 202, the second reflective layers 202 then reflect the light reflected thereto to the photic areas Q1 of the first substrate 204, and the light is emitted out of the display panel to achieve a display function.

In the display panel according to the present invention, degree of bending of the first reflective layers 201 may be controlled by changing voltages applied onto the control electrodes 203, and thus, a reflection angle at which the light emitted from the backlight source 101 is reflected after reaching the first reflective layers 201 may be controlled, and amount of light reaching the second reflective layers 202 is further controlled. In this way, the display panel is enabled to achieve various greyscales.

Each of the control units may further comprise at least one thin film transistor, and the electrode 203 may be connected to the thin film transistor. Specifically, the electrode 203 may be connected to a drain of the thin film transistor and further be connected to an external control circuit.

Similar to the display panel of the prior art, the display panel according to the present invention may comprise multiple columns of data lines and multiple rows of scan lines. Sources of the thin film transistors of the respective control units may be connected to different data lines, respectively, and gates of the thin film transistors in the same row may be connected to the same scan line. With this configuration, one thin film transistor may control one electrode 203. When power is on, a voltage may be selectively applied to the electrode 203 so that the first reflective layer 201 bends.

Figure 5:
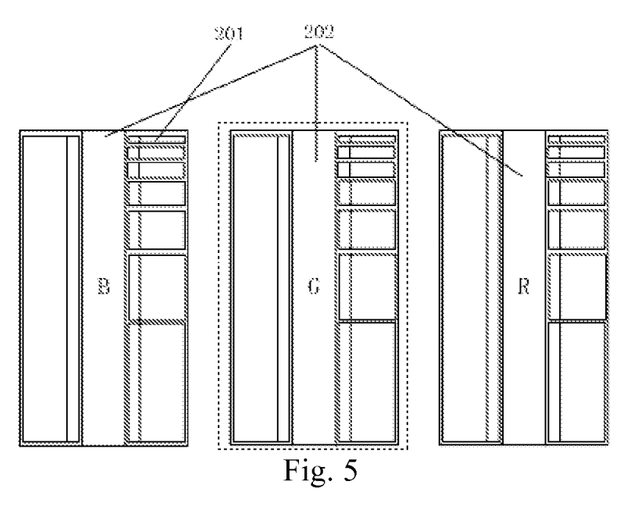
FIG. 5 is a schematic diagram of a pixel structure in which reflective sheets of a first reflective layer have different areas according to another embodiment of the present invention.

In addition to the means of controlling the degree of bending of the reflective sheet by adjusting the applied voltage so as to achieve different greyscales, different greyscales may also be achieved in the following manner: in one pixel unit, the first reflective layer 201 provided on the shading area Q2 of the first substrate 204 is formed to be a plurality of reflective sheets with different areas. Referring to FIG. 5, in the embodiment shown in FIG. 5, in one pixel unit (referring to the dashed box in FIG. 5), one photic area Q1 and two shading areas Q2 adjacent thereto are provided on the first substrate 204, the first reflective layer 201 provided on the two shading areas Q2 may be formed to be eight reflective sheets with different areas, and the areas of the respective reflective sheets increase progressively by doubling, that is, if the area of the reflective sheet with the smallest area is set to be 1, the areas of the other reflective sheets may be 2, 4, 8, 16, 32, 64 and 128, respectively. Referring to the embodiment shown in FIG. 3, in the embodiment of FIG. 5, the first reflective layer 201 includes two reflective sheet sets, one of the reflective sheet sets includes seven reflective sheets, the other reflective sheet set comprises one reflective sheet, and the eight reflective sheets included in the first reflective layer 201 have different areas from each other.

By applying voltages to different electrodes connected to different reflective sheets in one pixel unit, any of the reflective sheets in the one pixel unit may bend, respectively, so as to achieve a plurality of (256 in the embodiment shown in FIG. 5) greyscales. FIG. 5 illustrates the embodiment of the present invention, but the amount and arrangement of the reflective sheets as well as the area relationship among the reflective sheets in one pixel unit are not limited to the illustrated embodiment, and may be changed or adjusted based on requirements.

Compared to a traditional liquid crystal display, the display panel according to the present invention has a simpler manufacturing process (injecting liquid crystals is not required). The display panel according to the present invention may offer another choice, other than the liquid crystal display panel, for a user.

To achieve colour display, light reflected by two second reflective layers 202 adjacent to each other provided on the second substrate 205 may have different colours. That is, the reflective layers 202 provided on two adjacent shading areas Q2 of the second substrate 205 may have different colours.

In the display panel according to the present invention, every three pixel units may constitute one pixel structure.

Figure 7:
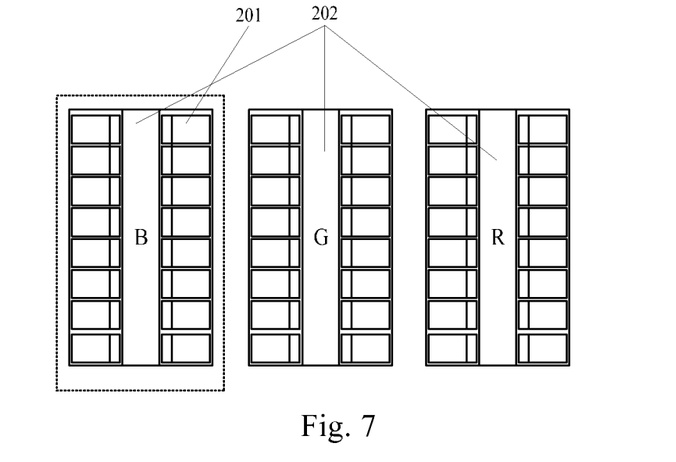
FIG. 7 is a schematic diagram of a pixel structure when light of backlight source is white light, according to an embodiment of the present invention.

According to an embodiment of the present invention, when the light emitted from the backlight source 101 is white light, in each pixel structure, the second reflective layers 202 provided on the shading areas Q2 of the second substrate 205 in three pixel units may be provided with red filter, green filter and blue filter, respectively, as shown in FIG. 7.

Figure 8:
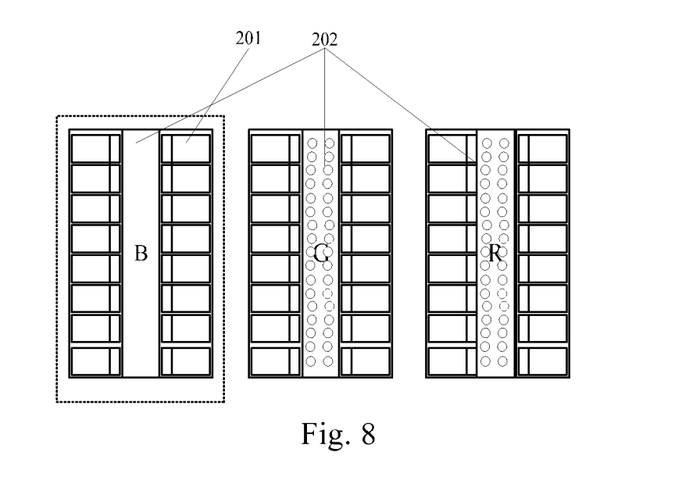
FIG. 8 is a schematic diagram of a pixel structure when light of backlight source is blue light, according to an embodiment of the present invention.

According to another embodiment of the present invention, the backlight source 101 may be configured to emit blue light. In this condition, in each pixel structure, the second reflective layers 202 provided on the shading areas Q2 of the second substrate 205 in two of the three pixel units may be provided with quantum dots with particle diameters of 4 to 6 nm and quantum dots with particle diameters of 2.2 to 3 nm, respectively. When excited by blue light, the quantum dots with particle diameters of 4 to 6 nm may emit red light and the quantum dots with particle diameters of 2.2 to 3 nm may emit green light, as shown in FIG. 8. Here, the quantum dots may have core-shell structure, and materials thereof may include any one or more of CdSe/ZnSe, CdSe/ZnS, CdSe/CdS, CdS/ZnS, CdS/HgS, CdSe/ZnS/CdS, CdSe/CdS/ZnS. In the expressions of the materials of the quantum dot in this embodiment, a material before '/' denotes a material of core of the quantum dot, and a material after '/' denotes a material of shell of the quantum dot, for example, CdSe/ZnSe denotes a core-shell quantum dot whose core has a material of CdSe and whose shell has a material of ZnSe.

Figure 6:
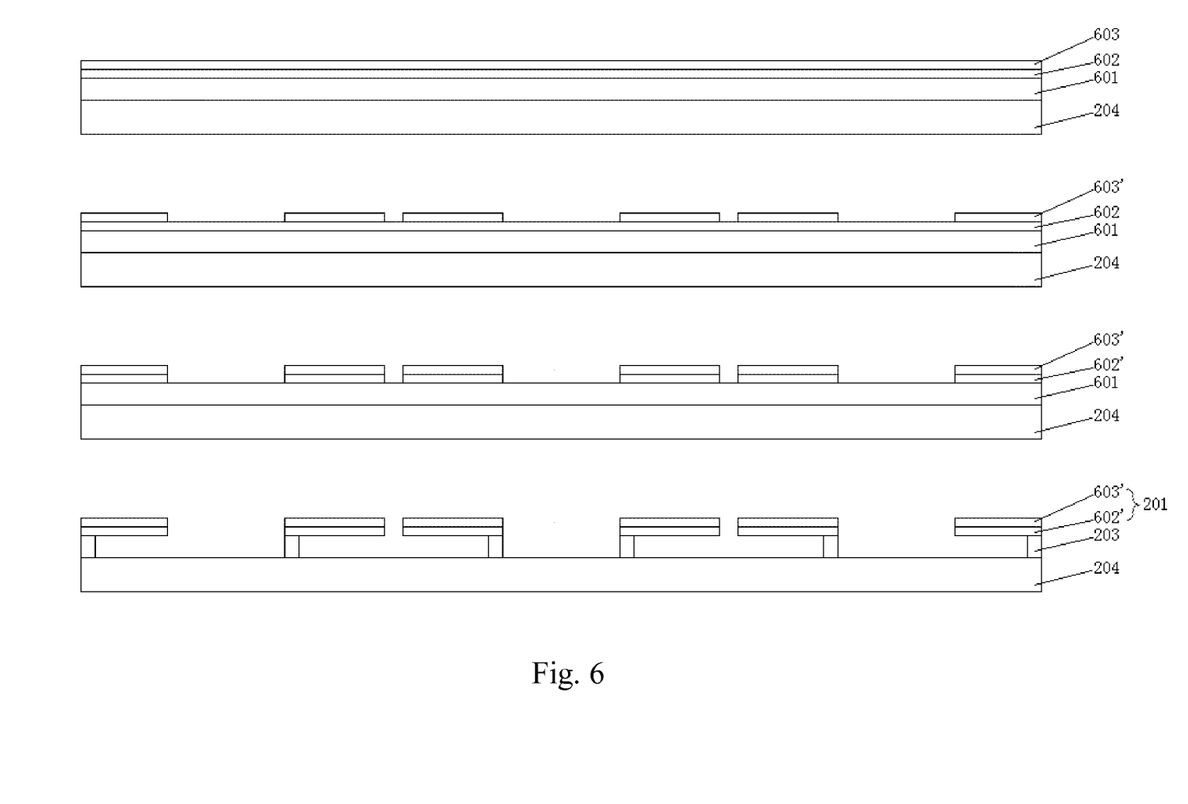
FIG. 6 schematically illustrates process steps of a method for forming first reflective layers and electrodes on shading areas of a first substrate of a display panel according to an embodiment of the present invention.

According to an embodiment of the present invention, each of the reflective sheets may comprise a light-reflecting film 603' and an electro-bend film 602' attached to the light-reflecting film 603', the electrode 203 may be provided on the side of the first substrate 204 opposite to the second substrate 205, and the electro-bend film 602' may be connected to the electrode 203, as shown in FIG. 6.

The electro-bend film 602' may be made of a material containing polyacrylic rubber or vinylidene fluoride compound. With the electro-bend film 602' made of the above material, the reflective sheet may bend in a direction away from the first substrate 204 when driven by the electrode 203.

In the display panel according to the present invention, the material used to form the light-reflecting film 603' of the reflective sheet and the material used to form the second reflective layer 202 are not limited. Preferably, the light-reflecting film 603' and the second reflective layer 202 may be made of a material including any one of reflective fabric, aluminium and copper.

According to an embodiment of the present invention, in order to avoid light leak of the display panel, the display panel may further comprise a shielding layer 206 which cover the shading areas Q2 of the first substrate 204. The shielding layer 206 may be provided on the light-exiting surface of the display panel (that is, on the upper surface of the first substrate 204 in FIG. 2). In addition, the shielding layer 206 may be provided on the side of the first substrate 204 opposite to the second substrate 205 and located between the first substrate 204 and the electrode 203.

The present invention further provides a method for manufacturing the above display panel, which comprises steps of:

preparing a first substrate 204, which includes a plurality of photic areas Q1 and a plurality of shading areas Q2;

forming first reflective layers 201 which are bendable on the shading areas Q2 of the first substrate 204;

preparing a second substrate 205, which includes a plurality of photic areas Q1 and a plurality of shading areas Q2;

forming second reflective layers 202 on the shading areas Q2 of the second substrate 205; and forming the display panel with the first substrate 204 and the second substrate 205, wherein, a side of the first substrate 204 on which the first reflective layers 201 are formed is opposite to a side of the second substrate 205 on which the second reflective layers 202 are formed, and projections of the shading areas Q2 of the first substrate 204 on the second substrate 205 completely cover the photic areas Q1 of the second substrate 205.

FIG. 6 schematically illustrates process steps of a method for forming the first reflective layers 201 and electrodes 203 on the shading areas Q2 of the first substrate 204 of the display panel according to an embodiment of the present invention;

Referring to FIG. 6, the method for forming the first reflective layers 201 and electrodes 203 may include steps of:

sequentially forming an electrode layer 601, an electro-bend film layer 602 and a light-reflecting film layer 603;

sequentially removing the light-reflecting film layer 603 and the electro-bend film layer 602 on the photic areas Q1 of the first substrate 204 through an etching process, keeping the light-reflecting film layer (light-reflecting film 603') and the electro-bend film layer (electro-bend film 602') on each shading area Q2 of the first substrate 204, and the remaining light-reflecting film layer and electro-bend film layer forming reflective sheets, and the reflective sheets forming the first reflective layers 201 on the shading areas Q2 of the first substrate 204; and patterning the electrode layer 601 through an etching process to form electrodes 203, such that each of the electrodes 203 is at one end of the reflective sheet.

In the etching process for the electrode layer 601, since the etching on the electrode layer 601 with an etchant is isotropic, the etchant may be caused to etch towards portions between the reflective sheet 201 and the first substrate 204 by way of controlling etching time and amount of the etchant, so as to ensure that each of the electrodes 203 is at one end of the reflective sheet 201.

According to an embodiment of the present invention, the color display may be achieved in the following manners.

When light emitted from the backlight source is white light, red filters, green filters and blue filters may be sequentially formed on the second reflective layer 202 by an ink-jet printing method, for example, so as to obtain the pixel structure shown in FIG. 7. In addition, red filters, green filters and blue filters may also be formed by using evaporation, transferring, conventional exposure, development and coating, or the like.

When light from the backlight source is blue light, quantum dots with particle diameters of 4 to 6 nm and quantum dots with particle diameters of 2.2 to 3 nm may be provided on the second reflective layers 202 by coating, evaporation, printing, transferring or the like, so as to obtain the pixel structure as shown in FIG. 8. At this point, the quantum dots with particle diameters of 4 to 6 nm may emit red light when excited by blue light, and the quantum dots with particle diameters of 2.2 to 3 nm may emit green light when excited by blue light.

In addition, the shielding layer 206 covering the shading areas Q2 of the first substrate 204 may be further formed on the first substrate 204. The shielding layer 206 may be provided on the light-exiting surface of the display panel (that is, on the upper surface of the first substrate 204 in FIG. 2). In addition, the shielding layer 206 may be provided on a side of the first substrate 204 opposite to the second substrate 205, and in this case, the shielding layer 206 are formed on the shading areas Q2 of the first substrate 204 before the first reflective layers 201 are formed.

The present invention further provides a display device comprising the display panel according to the present invention.

Natural light may be used as the light source of the display panel. Preferably, the display device may also comprise a backlight source 101, which is used as the light source of the display panel. The backlight source 101 may emit white light or blue light.

Preferably, the second substrate 205 of the display panel may be integrated with an optical film material of the backlight source 101 of the display device. The optical film material may comprise any one of a light guide plate, a diffusion plate and a prism film.

The display device may be any product or component with a display function, such as a mobile phone, a tablet computer, a television, a display, a notebook computer, a digital photo frame, a navigator or the like.

The display device according to the present invention comprises the display panel according to the present invention, and therefore, different greyscales and brightness control may be achieved.

In addition, the display device according to the present invention may also comprise other conventional structures, such as a power supply unit, a display driving unit and the like.

It can be understood that, the above implementations are merely exemplary implementations for explaining the principle of the present invention, but the present invention is not limited thereto. For those skilled in the art, various variations and improvements may be made without departing from the spirit and essence of the present invention, and these variations and improvements are also deemed as the protection scope of the present invention.

The invention claimed is:

1. A display panel, comprising:
a first substrate and a second substrate provided opposite to each other, each of the first substrate and the second substrate comprising a plurality of photic areas and a plurality of shading areas;
a plurality of pixel units formed between the first substrate and the second substrate; and
a plurality of control units which correspond to the plurality of pixel units, respectively,
wherein, in each of the pixel units, a projection of the shading area of the first substrate on the second substrate completely covers the photic area of the second substrate,
on a side of the first substrate opposite to the second substrate, a first reflective layer which is bendable is provided on each of the shading areas of the first substrate, and
on a side of the second substrate opposite to the first substrate, a second reflective layer is provided on each of the shading areas of the second substrate,
in each of the pixel units, the control unit corresponding to the pixel unit drives the first reflective layer provided on the shading area of the first substrate in the pixel unit to be in a bent state by providing driving voltage to the first reflective layer, and
the first reflective layers, in the bent state, are each capable of reflecting light, reaching the first reflective layer after passing through the photic areas of the second substrate, to the second reflective layers, and the second reflective layers reflect the light reflected thereto to the photic areas of the first substrate.

2. The display panel according to claim 1, wherein, each of the first reflective layers comprises at least one reflective sheet, and each of the control units comprises at least one electrode provided in the corresponding pixel unit, and each of the at least one electrode is connected to each of the at least one reflective sheet, respectively;
degree of bending of the reflective sheet varies with a driving voltage supplied by the electrode connected thereto.

3. The display panel according to claim 2, wherein, each of the control units further comprises at least one thin film transistor, and the electrode is connected to an external control circuit via the thin film transistor.

4. The display panel according to claim 1, wherein, light reflected by the second reflective layers provided on two adjacent shading areas of the second substrate has different colors.

5. The display panel according to claim 4, wherein, every three pixel units constitute one pixel structure, and
in each pixel structure, a red filter, a green filter and a blue filter are provided on the second reflective layers provided on the shading areas of the second substrate in the three pixel units, respectively.

6. The display panel according to claim 4, wherein, every three pixel units constitute one pixel structure, and
in each pixel structure, quantum dots with particle diameters of 4 to 6 nm and quantum dots with particle diameters of 2.2 to 3 nm are provided on the second reflective layers provided on the shading areas of the second substrate in two of the three pixel units, respectively, and when excited by blue light, the quantum dots with particle diameters of 4 to 6 nm emit red light and the quantum dots with particle diameters of 2.2 to 3 nm emit green light.

7. The display panel according to claim 6, wherein, a material of the quantum dots includes any one or more of CdSe/ZnSe, CdSe/ZnS, CdSe/CdS, CdS/ZnS, CdS/HgS, CdSe/ZnS/CdS, CdSe/CdS/ZnS.

8. The display panel according to claim 2, wherein, each of the reflective sheets comprises a light-reflecting film and an electro-bend film attached to the light-reflecting film, the electrode is provided on the side of the first substrate opposite to the second substrate, and the electro-bend film is connected to the electrode.

9. The display panel according to claim 8, wherein, the electro-bend film is made of a material containing polyacrylic rubber or vinylidene fluoride compound.

10. The display panel according to claim 8, wherein, the electro-bend film bends in a direction away from the first substrate when driven by the electrode.

11. The display panel according to claim 8, wherein, the light-reflecting film is made of a material containing any one of reflective fabric, aluminium and copper.

12. The display panel according to claim 1, wherein, the second reflective layer is made of a material including any one of reflective fabric, aluminium and copper.

13. The display panel according to claim 1, further comprising a shielding layer, which covers the shading areas of the first substrate.

14. A manufacturing method of the display panel according to claim 1, comprising steps of:
   preparing the first substrate, which includes the plurality of photic areas and the plurality of shading areas;
   forming the first reflective layers which are bendable on the shading areas of the first substrate;
   preparing the second substrate, which includes the plurality of photic areas and the plurality of shading areas;
   forming the second reflective layers on the shading areas of the second substrate; and
   forming the display panel with the first substrate and the second substrate,
   wherein, the side of the first substrate on which the first reflective layers are formed is opposite to the side of the second substrate on which the second reflective layers are formed, and the projections of the shading areas of the first substrate on the second substrate completely cover the photic areas of the second substrate.

15. The manufacturing method of a display panel according to claim 14, wherein, the step of forming the first reflective layers comprises steps of:
   sequentially forming an electrode layer, an electro-bend film layer and a light-reflecting film layer on the first substrate;
   sequentially removing the light-reflecting film layer and the electro-bend film layer on the photic areas of the first substrate through an etching process, and keeping the light-reflecting film layer and the electro-bend film layer on the shading areas of the first substrate, and the remaining light-reflecting film layer and electro-bend film layer forming reflective sheets, and the reflective sheets forming the first reflective layers on the shading areas of the first substrate; and
   patterning the electrode layer through an etching process to form electrodes, such that each of the electrodes is at one end of the reflective sheet.

16. The manufacturing method of a display panel according to claim 14, further comprising a step of:
   forming a shielding layer covering the shading areas of the first substrate on the first substrate.

17. A display device, comprising the display panel according to claim 1.

18. The display device according to claim 17, wherein, the display device further comprises a backlight source used as a light source for the display panel.

19. The display device according to claim 17, wherein, the second substrate of the display panel is integrated with an optical film material of the backlight source of the display device.

20. The display device according to claim 19, wherein, the optical film material comprises any one of a light guide plate, a diffusion plate and a prism film.

* * * * *